United States Patent Office 3,340,066
Patented Sept. 5, 1967

3,340,066
PROCESS OF MAKING BUTTERMILK BY
DIRECT ACIDIFICATION
Edgar A. Corbin, Jr., Somerset, and John E. Long, Murray Hill, N.J., assignors to Nopco Chemical Company, Newark, N.J., a corporation of New Jersey
No Drawing. Filed July 9, 1964, Ser. No. 381,547
13 Claims. (Cl. 99—54)

ABSTRACT OF THE DISCLOSURE

Chemically acidified buttermilk is prepared by introducing into milk having a butterfat content of about 0.02% to about 5% a heat activatable stabilizer which is subsequently activated. Then, a first addition of acid or acid liberating material is introduced in amounts sufficient to lower the pH of the milk to about 4.8 to about 5.1. The milk is then allowed to stand after which a second addition of acid or acid liberating material is introduced in amounts sufficient to lower the pH of the milk to about 4.2 to about 4.5.

This invention is directed to a new and improved buttermilk and, more particularly, this invention relates to a new and improved buttermilk produced by the direct acidification of milk to chemically ferment the milk.

Producing buttermilk by the direct chemical acidification process of milk having a butterfat content of from about 0.02% to about 5% by weight and a non-fat solids content of from about 8% to about 12% by weight is described in U.S. patent application 184,517, Edwards, filed Apr. 2, 1962, now abandoned. More recently in Ser. No. 381,523 Borenstein, filed July 9, 1964 and filed concurrently herewith, it has been found that by utilizing an edible, non-toxic, water soluble, metallic inorganic phosphate in the direct acidification process of preparing buttermilk, a buttermilk product is formed that has a uniform consistency and has no tendency to whey off after standing for prolonged periods of time of about two weeks under refrigeration. Generally the shelf-life of commercial bacterially produced buttermilk is about five days if kept at refrigerated temperatures. However, if the commercial bacterially produced buttermilk is kept under refrigeration for longer periods of time, spoiling and deterioration of the buttermilk product occurs making it unsuitable for human consumption.

It has been very desirable to produce a buttermilk that has a shelf-life under refrigeration of longer than five days or even two weeks. The short shelf-life of most commercially produced buttermilk prevents it from being shipped over long distances without the danger of spoilage and deterioration. Workers in the field have found it virtually impossible to produce a bacterially fermented buttermilk that can be allowed to stand under refrigeration for more than five days without spoiling. This is due to the fact that it is impossible to control the bacterial fermentation process within the buttermilk. Also the protection of the culture from bacterial contamination presents one of the most difficult problems in the commercial manufacture of buttermilk. Furthermore, the exposure of bacterially produced buttermilk for any period of time is conducive to the growth of any bacterial contamination in the culture. Hence, heretofore most of the buttermilk sold in a given area must be manufactured within a short distance of this area since it is impossible to ship bacterially produced buttermilk long distances due to the ever present danger of the growth of bacterial contaminates.

Another disadvantage that is present in commercially produced buttermilk is the spoilage and deterioration that occurs in buttermilk when this product is subjected to temperature changes. When most commercial buttermilks are allowed to reach room temperature from a refrigerated temperature, the rapid shock resulting from this temperature change tends to destroy the shelf-life of this product and spoilage of the buttermilk will occur even when this product is subsequently refrigerated. This destruction of the shelf life of this product is caused by the fact that the shock which results from this temperature change promotes rapid bacterial growth as well as the dehydration and denaturation of the protein in the milk producing whey-off. This is extremely disadvantageous since buttermilk must be handled and processed with extreme care and caution, utilizing expensive and complicated handling and processing techniques so as not to subject the buttermilk to the shock resulting from quick temperature changes.

It is an object of this invention to provide buttermilk that has an improved shelf life.

It is a further object of this invention to provide buttermilk that can stand for periods of up to about one month under refrigeration while maintaining its original viscosity, body, flavor and appearance.

It is a further object of this invention to provide buttermilk that can be transported long distances without the danger of spoilage.

It is a further object of this invention to provide buttermilk which can withstand the shock of being raised to room temperature from a refrigerated temperature without spoiling.

It is a further object of this invention to provide a process for producing buttermilk that can stand for a period of up to about one month under refrigeration while maintaining its original viscosity, body, flavor and appearance.

It is a further object of this invention to provide a process for producing buttermilk which can withstand the shock of being raised to room temperature from a refrigerated temperature without spoiling.

Further objects of the invention will be obvious and will in part appear hereinafter.

We have unexpectedly found that when buttermilk is produced by chemically fermenting milk having a butterfat content of from about 0.02% to about 5.0% by weight and a solids non-fat content of from about 8% to about 12% by means of first intimately introducing an edible organic stabilizer and then adding a non-toxic acid or acid liberating compound by means of a two-step addition process having an intermediate digestion step, said two-step acid addition process being carried out by first adding a portion of acid or acid-liberating compound until the pH of the milk is within the range of from about 4.8 to about 5.1, allowing the acidified milk to stand from 15 minutes to 3 hours or longer at a temperature of from about 40° F. to 80° F., and then adding a second portion of an acid or acid-liberating compound until the pH of the milk is within the range of from about 4.2 to about 4.5, while maintaining the butterfat content of the milk during this two-step acid addition process at approximately the level of at least that of the milk prior to acidification, a buttermilk product is produced which can stand under refrigeration for periods of up to about one month while maintaining its original viscosity, excellent body, flavor and appearance without the danger of any appreciable whey-off. Furthermore, the viscosity, body, flavor and appearance of the final buttermilk product is greatly enhanced. Additionally the problem of whey-off encountered by sudden changes in the temperature of the buttermilk such as occurs when the buttermilk is allowed to reach room temperature from a refrigerated temperature is eliminated. In this manner buttermilk is produced which can be shipped long distances under refrigeration without danger of spoilage. Furthermore, buttermilk produced in accordance with this invention can be handled and processed cheaply and simply without expensive and complicated processing procedures. In carrying out this process, it is preferred to add a water soluble, non-toxic, edible inorganic metallic phosphate such as the alkali metal and ammonium phosphates to the milk at any time prior to the two-step acid addition process. The phosphate gives the buttermilk additional stability, higher viscosity and substantially eliminates any trace of whey-off in buttermilk even when the buttermilk is allowed to stand for one month at a refrigerated temperature.

Our invention is predicated on the discovery that when stabilized milk having a predetermined butterfat and solids non-fat content which preferably may contain an edible non-toxic inorganic water-soluble phosphate is subsequently subjected to a two-stage acid addition process having an intermediate digestion step at a temperature of from about 40° F. to 80° F., buttermilk is produced that has a uniform consistency, taste, aroma, a shelf-life of up to one month under refrigeration and can withstand the shock of being raised to room temperature from a refrigerated temperature without spoilage or excessive whey-off. The phenomena whereby such results are achieved are not completely understood; however, it is noted that these results can be attributable to the interaction of the stabilizers with the protein of the milk whereby the protein is protected by means of combining under slightly acidified conditions with the stabilizer before the subsequent and final acidification level of buttermilk is reached. Hence it is essential that a digestion step take place before the final acidification level of buttermilk is reached so that the protein, stabilizer and acid are allowed to slowly interact under slightly acidic conditions prior to the milk reaching the final acidification level.

As seen from the above discussion, in order to produce buttermilk having the beneficial properties of this invention it is essential that milk having a butterfat content of 0.02% to 5% by weight and a solids non-fat content of 8% to 12% by weight have intimately introduced therein a stabilizer prior to acidifying by means of a two-stage acidification process having an intermediate digestion step at a temperature of 40° F. to 80° F. It is through the combination of all of these factors that buttermilk is produced that has a shelf-life under refrigeration of up to about a month as well as being able to withstand the shock of being raised to room temperature from a refrigerated temperature without spoilage or excessive whey-off. If any one of these factors are not present in preparing the buttermilk, a buttermilk product will not be produced having the aforementioned beneficial properties of this invention. This is shown by the fact that if the milk containing the stabilizer is acidified slowly without an intermediate digestion step, the aforementioned beneficial properties will not be obtained.

The new and improved buttermilk product is produced in accordance with this invention by adding to milk containing from about 0.02% to about 5% by weight of butterfat, based on the weight of the milk, and from about 8% to 12% by weight of solids non-fat based on the weight of the milk, one or more organic colloid stabilizers at a temperature of from about 34° F. to about 80° F. The stabilized milk may be then heated to a temperature range of about 160° F. to about 225° F. for a period of 10 seconds or longer to pasteurize the milk and intimately introduce the stabilizer into the milk. This heating step is then followed by cooling the milk to a temperature range of from about 35° F. to 85° F. In preparing the buttermilk product of this invention it is preferable to add an inorganic, edible, water-soluble metallic phosphate to the milk prior to the two-step acid addition process. The edible water-soluble inorganic metallic phosphate may be added, if desired, to the milk in an amount of from about 0.01% to 1% by weight of the phosphate, based on the weight of the milk. If desired the phosphate may be added to the milk in conjunction with the stabilizer prior to heating the milk to a temperature of from about 160° F. to 225° F. or it may be added just prior to the first acidification step when the milk is at a temperature of 35° F. to 85° F. The milk and edible inorganic water-soluble, inorganic, metallic phosphate may be stirred for a short period of time to intimately introduce the phosphate into the milk. After the phosphate is intimately introduced into the milk and the milk is at a temperature range of 35° F. to 85° F. an edible acid such as lactic acid or citric acid is added to the stabilized product until the pH of the stabilized product is within the range of from about 4.8 to 5.1. When the pH of the milk is in the range of from about 4.8 to 5.1, the milk is allowed to stand for at least 15 minutes at a temperature of from 40° F. to 80° F. After this period, a second supply of an edible acid or acid-liberating compound is added to the product until the pH of this product is within the range of 4.2 to 4.5. The flavor, texture, body and aroma of the final product may be modified by adding a starter distillate (a product made by the steam distillation of a lactic acid bacterial fermentation which contains diacetyl) to the acidified product. Generally to obtain the commercially best-tasting product, carbon dioxide gas or an edible carbon dioxide liberating compound such as liquid carbon dioxide, Dry Ice, sodium carbonate, sodium bicarbonate, potassium carbonate, potassium bicarbonate, etc., can be added to the milk while the milk is at temperatures of 35° F. to 85° F. at any time prior to the first acidification step.

As can be seen from the above procedure, the manufacture of buttermilk can be performed continuously and economically without any delays such as the 15 to 48 hour process time which was presently required because of the slowness of the fermentation reaction that is encountered when bacterial cultures are added to produce buttermilk. The process of this invention can be carried out in a period of from about one hour to five hours. For best results the milk which is used as a starting material should be of good quality and be homogenized. Unhomogenized milk may be used as a starting material in this invention but in most cases it is best to use homogenized milk as a starting material. In accordance with this process, the milk is pasteurized during the step of intimately introducing the stabilizer into the milk when the milk is heated to a temperature of from about 160° F. to about 225° F. In carrying out the process of making buttermilk, it is preferred that the stabilizer be added to the milk at a temperature of 34° F. to 80° F. so that the stabilizer can easily be incorporated into the milk either in the form of a mixture, dispersion or solution. Furthermore, the edible water-soluble organic metallic phosphate may be added to the milk in conjunction with the stabilizer while mixing at temperatures of from about 34° F. to about 80° F. If lower temperatures are utilized the milk may start to freeze or solidify thus making it very difficult to achieve proper mixing of the stabilizer and/or the edible inorganic phosphate with the milk. It has been found that at above 85° F. it becomes a little more difficult to initially introduce the stabilizer as well as the phosphate into the milk. Hence if higher temperatures are used higher mixing speeds and longer mixing times may be required to initially introduce the colloidal organic stabilizer into the milk. If very high temperatures are utilized such as 225° F., expensive equipment may have to be used to form a uniform mixture or dispersion. Many known edible stabilizers or mixtures of edible stabilizers may be utilized in the process of this invention to produce a buttermilk. Typical edible colloid stabilizers which may be utilized in this invention include gelatin, casein, protein, carrageenan, flour, tapioca flour and other hydrophilic colloids, starches including modified starch, polysaccharides, agar, Irish moss extract, algin, locust bean gum, guar gum, cellulose gums, such as carboxy methyl cellulose and methyl cellulose, gum tragacanth, gum arabic, tapioca starch, pectin, corn starch, corn flour and mixtures thereof.

While previously stabilizers such as those disclosed below have been utilized in preparing fruit flavor milk drinks, as shown by U.S. Patent No. 2,853,386, Hughes, Sept. 23, 1958, or in fermented milk products as shown by U.S. Patent No. 2,364,614, Epstein, or as thickeners and substitution agents in the manufacture of ice cream, their use in producing buttermilk without utilizing bacterial cultures has not been known. Applicants have found that through the use of these stabilizers it is possible to produce an improved buttermilk product in accordance with this invention without utilizing bacterial cultures. The amount of organic stabilizer added to the milk to produce all of the beneficial properties inherent in this invention should be at least 0.01% by weight or above based on the weight of the milk. Any amount above 0.01% by weight of stabilizer may be utilized to produce the product of this invention. For best results no more than 5% by weight of the stabilizer or mixture of stabilizers is needed to produce the improved buttermilk product of this invention. We have found that adding more than 5% by weight of stabilizer will not be desirable for general consumption purposes. The choice of the amount of stabilizer depends to a large extent upon the characteristics of viscosity and like properties desired in the finished buttermilk product, which in turn is indicated by consumer preferences in various marketing areas.

It is preferred in producing the aforementioned beneficial results to incorporate any water-soluble, edible, inorganic metallic phosphate such as the alkali metal phosphates or ammonium phosphates into the milk prior to the two-step acid addition process. Included among these phosphates are orthophosphates, pyrophosphates, metaphosphates, trimetaphosphates, polyphosphates, as well as polycyclic phosphates. Typical compounds included among the aforementioned classes which may be utilized in this invention include triammonium phosphate, tetrasodium pyrophosphate, mono potassium dihydrogen phosphate, dipotassium hydrogen phosphate, mono sodium dihydrogen phosphate, disodium monohydrogen phosphate, tetrapotassium pyrophosphate, ammonium pyrophosphate, tripotassium phosphate, mono ammonium dihydrogen phosphate, diammonium hydrogen phosphate, ammonium tripolyphosphate, sodium polycyclic phosphate, monopotassium monosodium monohydrogen phosphate, trisodium phosphate, trisodium aluminum pyrophosphate, dipotassium monohydrogen phosphate, tetra ammonium pyrophosphate, tetra potassium pyrophosphate, sodium ammonium pyrophosphate, pentasodium tripolyphosphate, pentapotassium tripolyphosphate, sodium metaphosphate, potassium metaphosphate, sodium tetrametaphosphate. The inclusion of a metallic phosphate in producing buttermilk enhances the properties of flavor, viscosity, body and appearance of the buttermilk produced by this method.

In order to achieve the beneficial results of these phosphates, the non-toxic inorganic metallic phosphate should be added any time prior to the addition of the acid in an amount of at least 0.01% by weight of phosphate, based on the weight of the milk. Generally, for best results, no more than 1% of phosphate based on the weight of the milk need be added to the milk. However, if desired, the aforementioned beneficial results can be achieved without the use of these metallic phosphates.

In order to chemically ferment milk by direct acidification to produce the buttermilk product of this invention, it is essential that during the two-step acidification of the milk, the percent butterfat content of the milk should not be substantially lowered. In this manner a buttermilk product will be obtained having approximately the same butterfat content of the milk which is acidified. The phenomena whereby chemical fermentation of milk by chemical acidification takes place is believed due to the direct attack by the acid upon the solids portion of the milk containing the protein to denature the protein within the solids portion of the milk. In producing buttermilk the solids non-fat portion of the milk is fixed at from about 8% to 12% by weight based on the weight of the milk and the butterfat content is fixed at from about 0.02% to about 5% by weight of the milk. In producing buttermilk from milk by means of the two-stage chemical acidification, any substantial diluting or decreasing of the butterfat content of the milk during the acidification stage will deleteriously effect both the non-fat solids and butterfat portions of the milk so as not to produce a chemically fermented buttermilk product. Thus in order to carry out the fermentation procedure of this invention to produce buttermilk, the percent butterfat content should be maintained substantially constant during the two-stage acidification process. Additional butterfat and solids may be added before the two-stage acidification process to increase the solids portion of the milk without deleteriously effecting the denaturation of the protein by the acid preventing the formation of buttermilk. By utilizing the process of this invention one can produce buttermilk quickly and economically, employing a variety of means without utilizing bacterial cultures, hence avoiding the disadvantages which are inherent in such systems. By controlling the conditions in the production of buttermilk such as for example, controlling the temperature of the milk during the processing and controlling the rate of addition of acid and stabilizer to the milk, buttermilk can be economically and continuously produced having any desired consistency, appearance, texture and flavor.

The acid addition is carried out in two stages containing an intermediate digestion step which allows the protein, stabilizer and, if present, the edible water-soluble inorganic metallic phopshate to interact under slightly acidic conditions to stabilize the protein in the milk against the shock which occurs when the final acidification level of buttermilk is reached. The first step in the two-stage acidification step is performed by adding a sufficient amount of acid to produce a pH of from about 4.8 to about 5.1 within the milk. If not enough acid is added to the milk to reduce its pH to about 5.1 or below, the interaction betwen stabilizer and protein will not take place during the digestion stage. Hence the protein will not be protected against the shock that occurs during the final acidification step and a buttermilk having the aforementioned properties will not be produced. If too much acid is added and a pH of below 4.8 is reached in the milk during the first acidification step, the product will be too acid and the shock upon the protein in the milk will be too great to produce the requisite stabilization necessary to produce a product having the beneficial properties of this invention.

In carrying out the first acid addition step, any edible, non-toxic acid, acidogens or mixtures of acids and acidogens may be utilized depending upon the texture and flavor of the buttermilk. The acids which may be used include succinic acid, maleis acid, nitric acid, acetic acid, adipic acid, hydrochloric acid, phosphoric acid, citric acid, lactic acid and mixtures thereof. Any of the non-toxic acidogens such as D-glucono delta lactone, gamma glactono lactone, tetramethyl delta mannono lactone, tetra methyl delta glucono lactone, tetramethyl delta glactono lactone, trimethyl delta arabano lactone, tetramethyl gamma glucono lactone, and trimethyl gamma arabano lacotne, which yield non-toxic edible acids upon hydrolysis may be utilized. Typical acidogens are disclosed in U.S. Patent No. 2,982,654, Hammond et al. May 2, 1961. The choice of a typical acid or acidogen and the desired pH as with the choice of stabilizer or phosphate depends to a large extent upon the relative characteristics of viscosity, flavor and the like properties in the finished buttermilk product which in turn are indicated by consumer preferences in various marketing areas. The acids or acidogens or mixture thereof should be added in solid form where possible so as not to dilute or decrease the butterfat content of the milk.

In order to produce the proper reaction between the phosphate, protein and stabilizer, the temperature during the first stage acid addition should be maintained within the range of from about 35° F. to about 85° F. After the pH of the milk is within the range of from 4.8 to 5.1, the milk should then be allowed to stand at a temperature of from 40° F. to 80° F. for a period of at least 15 minutes. In this manner interaction between the protein, stabilizer and, if present, the phosphate under slightly acidic conditions will be allowed to occur. It has been found that no extra added beneficial results are produced by allowing the milk to stand for more than 3 hours at this temperature. Hence, since in most cases a quick processing time is desired, the milk is seldom if ever allowed to stand for more than 3 hours at this temperature prior to the second acidification step.

The second stage of the acidification process is carried out by adding sufficient acid to the digested milk product to bring the pH of the milk within the range of from about 4.2 to about 4.5. This second acidification should be carried out at a temperature of from about 35° F. to about 85° F. while mixing. Any edible non-toxic acids or acidogens may be utilized depending upon the texture and flavor of the final buttermilk product. Included among the non-toxic acids and acidogens which may be utilized are those which have been enumerated above. It is essential that the final pH of the milk during the second acidification step be within the range of about 4.2 to about 4.5 so as to produce a commercially acceptable buttermilk having the aforementioned beneficial properties.

After the second acidification step the product may, if desired, be bottled and refrigerated or, if desired, the product may be allowed to stand at a temperature of from about 40° F. to 80° F. for a period of at least 15 minutes so as to allow further settling of the acid in the milk prior to bottling and refrigerating. The second digestion step, like the first, is seldom performed for a longer period than 3 hours since no additional beneficial results are obtained by allowing the milk to stand for 3 hours at 40° F. to 80° F. After the second digestion step, the milk can then be bottled and refrigerated.

It is understood that the term milk as used throughout the specification and claims means whole milk, skim milk and reconstituted milk products having a butterfat content of from about 0.02% to about 5% by weight and a non-fat solids content of 8% to 12%.

By the term without substantially lowering the butterfat content as used throughout the specification and claims, we mean that the butterfat content of milk that is used to prepare the chemically fermented milk product is not lowered more than 3% during the two-stage acid addition and before the subsequent formation of the buttermilk.

The following examples further illustrate the present invention, however they are not to be construed in a limiting sense.

*Example I*

This example is directed to producing the new and improved buttermilk of this invention.

To 2 quarts of milk having a butterfat content of 0.75% by weight and a solids non-fat content of 9.5% by weight brought to a temperature of about 40° F. there was added a mixture of stabilizer consisting of 0.75 gram of locust bean gum and 0.25 gram of carrageenan. The stabilizer was added to the milk under constant stirring by means of an agitator. After all of the stabilizer mixture was added, stirring was continued for 10 minutes. After this period, the temperature was then raised to 182° F. to intimately introduce the stabilizer into the milk and to pasteurize the milk. This temperature was maintained for 15 seconds after which the milk was quickly cooled to 80° F. At 80° F., 7 grams of disodium dihydrogen pyrophosphate was added to the milk. After all of the pyrophosphate was added to the milk, the temperature of the milk was maintained at 80° F. while an acid mixture was added. This mixture consisted of 3.5 grams of solid citric acid, 3 grams of table salt, and 9 grams of solid lactic acid lactide. When all of the acid mixture was added, the milk was stirred for 20 minutes to dissolve the ingredients. The pH of this acidified milk was about 5.1. After this period, the stirring was discontinued and the acidified milk was digested by means of allowing the milk to sit motionless for about one and one-half hours at a temperature of about 80° F. At the end of this period, the pH of the milk was about 4.8. A firm, smooth curd formed during this period. This curd was broken up gently by stirring slowly while cooling until the temperature of the milk was 60° F. After the curd was broken up, 3 grams of an 80% by weight aqueous solution of lactic acid and 1.5 grams of starter distillate were added to the milk under constant stirring. After all of the lactic acid was added, the pH of the milk was about 4.3. After mixing for one minute, a buttermilk product was produced that had a uniform consistency. The product was bottled and then refrigerated at 40° F. The product was allowed to set at this temperature for about 1 month. At the end of this period, no whey-off appeared. Additionally, the product, after standing for this period, had a uniform smoothness and no off-flavors were detected.

*Example II*

This example is directed to producing buttermilk by means of a one-step acid addition.

To 3600 ml. of skim milk having a butterfat content of 1% by weight and a solids non-fat content of 9.5% by weight was added a stabilizer consisting of 3 grams of locust bean gum, 1 gram of carrageenan and 10 grams of monopotassium phosphate ($KH_2PO_4$). The mixture was added to the milk under constant stirring by means of an agitator. The temperature was then raised to 182° F. while the above additives were mixed by means of an agitator. After 30 minutes at this temperature, the stabilized milk product was quickly cooled to 90° F. At this temperature, 7 grams of sodium bicarbonate and 6 grams of sodium chloride were added to the stabilized milk product. An acid mixture consisting of 14.5 grams of an 80% by weight aqueous solution of lactic acid, 10.4 grams of solid citric acid and 3.0 grams of starter distillate was added to the milk. After all of this acid mixture was added to the milk, the milk was allowed to sit motionless for 30 minutes. The acidified milk had a pH of 4.3. After this period, the milk was stirred for 5 minutes and then bottled in conventional nine-inch quart glass milk bottles. The bottled product was then placed under refrigeration. At the end of one day of standing at refrigerated temperatures, a trace of whey-off was noticed. At the end of 14 days, there appeared one inch of whey-off which indicated that this buttermilk product was not stable for more than 14 days under refrigeration.

*Example III*

This example is directed to producing buttermilk without utilizing a stabilizer and carrying out the acidification in one step.

To 2,000 ml. of skim milk having a butterfat content of 1% by weight and a solids non-fat content of 9.5% by weight brought to a temperature of about 40° F. was added a mixture consisting of 2.5 grams of salt (NaCl), 4.5 grams of monopotassium phosphate ($KH_2PO_4$) and 0.5 gram of dipotassium phosphate ($K_2HPO_4$). This mixture was added to the milk under constant stirring by means of an agitator. The temperature was then raised to about 190° F. to intimately introduce the above additive into the milk and to pasteurize the milk. After 30 minutes at this temperature, the milk was quickly cooled to 50° F. After the milk was cooled to 50° F., an acid mixture consisting of 7.2 grams of an 80% by weight aqueous solution of lactic acid, 5.2 grams of solid citric acid and 1.5 grams of starter distillate was added to the milk product under constant stirring. The pH of this resultant milk product was 4.4. After mixing for one minute a buttermilk product having a uniform consistency was produced. This product was bottled in a conventional 9-inch glass quart milk bottle and placed under refrigeration. After 5 days under refrigeration, more than 4 inches of whey-off were detected in this product indicating that this product was completely unstable.

*Example IV*

This example is directed to producing the new and improved buttermilk of this invention.

To 40 gallons of milk having a butterfat content of 1% by weight and a solids non-fat content of 9.6% by weight brought to a temperature of about 40° F., there was added a mixture of a stabilizer consisting of 152 grams of locust bean gum and 40 grams of carrageenan. Additionally 240 grams of mono ammonium phosphate ($NH_4H_2PO_4$) were added to the milk along with the stabilizer. These ingredients were added to the milk under constant stirring by means of an agitator. After all of these ingredients were added, stirring was continued for 10 minutes. After this period, the temperature of the milk was then raised to 190° F. to intimately introduce the stabilizer as well as the phosphates into the milk and to pasteurize the milk. This temperature was maintained for about thirty minutes, after which the milk was quickly cooled to about 70° F. At about 70° F. 200 grams of sodium chloride was added to the milk. Also at this temperature 0.1 lb. of carbon dioxide gas was passed into the milk. The temperature of the milk was then slowly lowered to about 49° F. At this temperature an acid mixture was added to the milk. This mixture consisted of 570 grams of an 80% by weight aqueous solution of lactic acid, 134 grams of solid citric acid, 66 grams of glacial acetic acid and 1.5 grams of starter distillate. When all of the acid mixture was added, the milk was stirred for about 2 minutes to dissolve the ingredients. The pH of this acidified milk was about 4.85. After this period, the stirring was discontinued and the acidified milk was digested by means of allowing the milk to sit motionless for about 45 minutes at a temperature of about 50° F. After this period, a second acid mixture was added to the milk under constant stirring. This acid mixture consisted of 285 grams of an 80% by weight aqueous solution of lactic acid, 67 grams of solid citric acid, 33 grams of glacial acetic acid, and 40 grams of starter distillate. After all of this acid mixture was added, the pH of the milk was about 4.4. After mixing for one minute a buttermilk product was produced that had a uniform consistency. This product was allowed to sit for 15 minutes. After this period the product was bottled in conventional nine-inch quart glass milk bottles. The bottled product was then placed under refrigeration. At the end of one day of standing at refrigerated temperatures, no whey-off was noticed. At the end of 30 days of standing at refrigerated temperatures no whey-off was observed.

*Example V*

This example is directed to producing buttermilk in accordance with this invention except that no phosphate is added to the milk prior to acidification.

To 40 gallons of milk having a butterfat content of 1% by weight and a solids non-fat content of 9.6% by weight brought to a temperature of about 40° F. there was added a mixture of a stabilizer consisting of 152 grams of locust bean gum and 40 grams of carrageenan. These stabilizers were added to the milk under constant stirring by means of an agitator. After all of these stabilizers were added, stirring was continued for 10 minutes. After this period the temperature was then raised to 190° F. to intimately introduce the stabilizer into the milk and to pasteurize the milk. This temperature was maintained for 30 minutes after which the milk was quickly cooled to about 70° F. At about 70° F. 200 grams of sodium chloride was added to the milk. Also at this temperature 0.1 lb. of carbon dioxide gas was passed into the milk. The temperature of the milk was then slowly lowered to about 49° F. At this temperature an acid mixture was added to the milk. This mixture consisted of 570 grams of an 80% by weight aqueous solution of lactic acid, 134 grams of solid citric acid, 66 grams of glacial acetic acid and 80 grams of starter distillate. When all of the acid mixture was added, the milk was stirred for about 2 minutes to dissolve the acids. The pH of this acidified milk was about 4.85. After this period, the stirring was discontinued and the acidified milk was digested by means of allowing the milk to sit motionless for about 45 minutes at a temperature of about 50° F. After this period a second acid mixture was added to the milk under constant stirring. This acid mixture consisted of 285 grams of an 80% by weight aqueous solution of lactic acid, 67 grams of solid citric acid, 33 grams of glacial acetic acid and 40 grams of starter distillate. After all of this acid mixture was added, the pH of the milk was about 4.4. After mixing for one minute a buttermilk product was produced that had a uniform consistency. This product was allowed to sit for 15 minutes. After this period the product was bottled in a conventional nine-inch quart glass milk bottle. The bottled product was then placed under refrigeration. At the end of one day of standing at refrigerated temperatures, no whey-off was noticed. At the end of 30 days of standing at refrigerated temperatures a small amount of whey-off was noticed. The results seen by comparing Examples IV and V indicate that while a buttermilk prepared without utilizing a phosphate is stable by allowing it to stand at refrigerated temperatures for a period of about one month, it is not as stable as buttermilk produced by means of utilizing a phosphate. Hence by utilizing a phosphate prior to the two-step addition process any problem of whey-off in the buttermilk after standing for one month at refrigerated temperatures is substantially eliminated.

*Example VI*

This example is directed to producing the new and improved buttermilk of this invention.

To 100,000 parts by weight of milk having a butterfat content of 1% by weight and a solids non-fat content of 9.5% by weight brought to a temperature of 50° F. there was added a mixture of a stabilizer consisting of 97 parts by weight of locust bean gum and 25 parts by weight of carrageenan. 180 parts by weight of mono ammonium phosphate ($NH_4H_2PO_4$) was added to the milk along with the stabilizer under constant stirring by means of an agitator. After all of these ingredients were added, stirring was continued for 10 minutes. After this period, the temperature was then raised to 184° F. to intimately introduce the stabilizer into the milk and to pasteurize the milk. This temperature was maintained for about thirty minutes after which the milk was quickly cooled to 70° F. At this temperature 153 parts by weight of sodium chloride was added to the milk. Also at this temperature 32 parts by weight of carbon dioxide gas was passed into the milk. The milk was then slowly cooled to about 50° F. After the milk was cooled to about 50° F., an acid mixture was added to the milk. This acid mixture consisted of 363 parts by weight of an 80% by weight aqueous solution of lactic acid, 86 parts by weight of solid citric acid, 43 parts by weight of glacial acetic acid and 52 parts by weight of starter distillate. The milk was stirred for about 2 minutes to dissolve all of the ingredients. The pH of the acidified milk was about 5.0. After this period the stirring was discontinued and the acidified milk was digested by means of allowing the milk to sit motionless for about one hour at a temperature of about 50° F. After this period, a second acid mixture was added to the milk. This acid mixture consisted of 181 parts by weight of an 80% by weight aqueous solution of lactic acid, 43 parts by weight of solid citric acid, 21 parts by weight of glacial acetic acid and 26 parts by weight of starter distillate.

After all of the acid mixture was added, the pH of the milk was about 4.5. After mixing for about one minute a buttermilk product was produced that had a uniform consistency. The product was then allowed to sit for 30 minutes. After this period the product was bottled in conventional nine-inch quart glass milk bottles. The bottled product was then placed under refrigeration. After standing under refrigeration for 30 days no whey-off appeared.

*Example VII*

This example is directed to producing the new and novel buttermilk of this invention as well as showing the resistance to heat shock of the buttermilk produced in accordance with this invention.

To 3,780 ml. of milk having a butterfat content of 1% by weight and a solids non-fat content of 10% by weight brought to a temperature of about 40° F. was added a mixture consisting of 4 grams of locust bean gum, 1 gram of carrageenan, 5 grams of mono ammonium phosphate ($NH_4H_2PO_4$) and 1 gram of dipotassium phosphate ($K_2HPO_4$). This mixture was added to the milk under constant stirring by means of an agitator. The temperature was then raised to about 190° F. to intimately introduce the above additives into the milk and to pasteurize the milk. After 30 minutes at this temperature the milk was quickly cooled to 70° F. At this temperature 4.5 grams of sodium chloride was added to the milk. After all of the sodium chloride was added to the milk, the milk was cooled to 50° F. After the milk was cooled to 50° F. an acid mixture consisting of 14.2 grams of an 80% by weight aqueous solution of lactic acid, 3.4 grams of solid citric acid, 1.7 grams of glacial acetic acid and 2 grams of starter distillate were added to the milk product under constant stirring. The pH of the resultant milk product was 4.9. After this period, the stirring was discontinued and the acidified milk was digested by allowing the milk to sit motionless for about 45 minutes at a temperature of 50° F. After this period a second mixture of acid consisting of 7.1 grams of an 80% by weight aqueous solution of lactic acid, 1.7 grams of solid citric acid, 0.8 gram of glacial acetic acid and 1 gram of starter distillate were added to the milk. After all of the acid mixture was added, the pH of the milk was about 4.5. This product was allowed to sit for about 15 minutes. After this period, the milk was bottled in conventional nine-inch quart glass milk bottles. The bottled product was then placed under refrigeration.

After one day the bottled product was removed from the refrigerator. No whey-off was noticed. The temperature of the sample was then raised to about room temperature and allowed to sit at room temperature (68° F.) for about 3 hours. After this period the sample was placed under refrigeration. After about 20 days the sample was removed from the refrigerator and no whey-off appeared. As seen from this test the stability of the buttermilk product of this invention is not destroyed by allowing the buttermilk to reach room temperature after refrigeration. Hence the shock of raising the temperature of the buttermilk of this invention to room temperature from a refrigeration temperature will not adversely affect the stability of the buttermilk product of this invention.

*Example VIII*

This example is directed to producing buttermilk by means of a two-step acid addition process wherein the first step the pH of the milk is lowered to about 5.2.

To four quarts of milk having a butterfat content of 1% by weight and a solids non-fat content of 10% by weight brought to a temperature of 50° F. there was added a mixture of a stabilizer consisting of three grams of locust bean gum, one gram of carrageenan, eight grams of mono potassium phosphate ($KH_2PO_4$) and two grams of dipotassium phosphate ($K_2HPO_4$). These ingredients were added to the milk under constant stirring by means of an agitator. After all of these ingredients were added stirring was continued for 10 minutes. After this period the temperature of the milk was then raised to 190° F. to intimately introduce the stabilizer as well as the phosphates into the milk and to pasteurize the milk. This temperature was maintained for about thirty minutes, after which the milk was quickly cooled to about 50° F. At this temperature 6 grams of sodium cholride were added to the milk. After all of the sodium chloride was added, a first acid mixture was added to the milk. This mixture consisted of 10.6 grams of an 80% by weight aqueous solution of lactic acid, 2.6 grams of solid citric acid, 1.2 grams of acetic acid and 1.5 grams of starter distillate. When all of the acid mixture was added, the milk was stirred for about 2 minutes to dissolve the ingredients. The pH of this acid mixture was about 5.2. After this period the stirring was discontinued and the acidified milk was digested by means of allowing the milk to set motionless for about 15 minutes at a temperature of about 50° F. After this period a second acid mixture was added to the milk under constant stirring. This acid mixture consisted of 10.6 grams of an 80% by weight solution of lactic acid, 2.6 grams of solid citric acid, 1.2 grams of glacial acetic acid and 1.5 grams of starter distillate. After all of this acid mixture was added, the pH of the milk was about 4.35. This product was allowed to set for thirty minutes. After this period the product was bottled in conventional nine-inch quart glass milk bottles. The bottled product was then placed under refrigeration. At the end of one day of standing under refrigeration no whey-off was observed. However the viscosity of this product after standing for one day was about 270 centipoises at 40° F. which indicated that a buttermilk product was not produced.

*Example IX*

This example is directed to producing buttermilk by means of a two-step acid addition process where in the first step the pH of the milk is lowered to about 4.6.

To four quarts of milk having a butterfat content of 1% by weight and a solids non-fat content of 10% by weight brought to a temperature of 50° F. there was added a mixture of a stabilizer consisting of 2.8 grams of locust bean gum, 1 gram of carrageenan, 7 grams of mono potassium phosphate ($KH_2PO_4$) and 2 grams of dipotassium phosphate ($K_2HPO_4$). These ingredients are added to the milk under constant stirring by means of an agitator. After all of these ingredients were added, stirring was continued for 10 minutes. After this period the temperature of the milk was then raised to 190° F. to intimately introduce the stabilizer as well as the phosphates into the milk and to pasteurize the milk. This temperature was maintained for about thirty minutes after which the milk was quickly cooled to about 50° F. At this temperature 6 grams of sodium chloride were added to the milk. After all of the sodium chloride was added to the milk a first acid mixture was added to the milk. This mixture consisted of 15.9 grams of an 80% by weight aqueous solution of lactic acid, 3.8 grams of solid citric acid, 1.8 grams of acetic acid and 2.25 grams of starter distillate. When all of the acid mixture was added, the milk was stirred for about 2 minutes to dissolve the ingredients. The pH of this acid mixture was about 4.6. After this period the stirring was discontinued and the acidified milk was digested by means of allowing the milk to set motionless for about 15 minutes at a temperature of about 50° F. After this period a second acid mixture was added to the milk under constant stirring. This acid mixture consisted of 5.3 grams of an 80% by weight solution of lactic acid, 1.3 grams of solid citric acid, 0.6 gram of glacial acetic acid and 0.75 gram of starter distillate. After all of this acid mixture was added, the pH of the milk was about 4.3. This product was allowed to set for twenty minutes. After this period the product was bottled in conventional nine-inch quart glass milk bottles. The bottled product was then placed under refrigeration.

At the end of three days of standing under refrigeration, ⅜" whey-off was observed. At the end of seven days of standing under refrigeration, one inch of whey-off was observed which indicated that the product prepared by the above method was not stable after standing for seven days under refrigeration.

*Example X*

This example is directed to producing the new and improved buttermilk of this invention.

To 2 quarts of milk having a butterfat content of 0.7% by weight and a solids non-fat content of 9.5% by weight brought to a temperature of about 40° F., there is added a mixture of a stabilizer consisting of 0.75 gram of locust bean gum and 0.25 gram of carrageenan. The stabilizer is added to the milk under constant stirring by means of an agitator. After all of the stabilizer mixture is added stirring is continued for 10 minutes. After this period the temperature is then raised to 182° F. to intimately introduce the stabilizer into the milk and to pasteurize the milk. This temperature is maintained for 15 seconds after which the milk is quickly cooled to 80° F. At this temperature an acid mixture is added to the milk. This mixture consists of 4 grams of solid citric acid and 9 grams of solid lactic acid lactide. When all of the acid mixture is added the milk is stirred for about 20 minutes so as to dissolve all of the ingredients. The pH of this acidified milk is about 5.0. After this period, stirring is discontinued and the acidified milk is digested by means of allowing the milk to set motionless for about one and one-half hours at a temperature of about 80° F. At the end of this period, the pH of the milk is about 4.8. A firm, smooth curd forms during this period. This curd is broken up gently by stirring slowly while cooling until the temperature of the milk is 60° F. After this curd is broken up about 5 grams of an 80% by weight aqueous solution of lactic acid is added to the milk under constant stirring. After all of the lactic acid is added the pH of the milk is about 4.3. After mixing for one minute a buttermilk product is produced that has a uniform consistency. This product is bottled and then refrigerated at 40° F. After standing for one month at this temperature this product has a uniform consistency and no whey-off.

Having described our invention, what we claim as new and desire to secure by Letters Patent is:

1. A process of preparing buttermilk by direct chemical acidification comprising the following steps:
    (a) intimately introducing an edible colloid stabilizer in milk having a butterfat content of from about .02% to about 5% by weight and a non-fat solids content of from about 8% to about 12% by weight,
    (b) heating said stabilizer-containing milk to a temperature of from about 160° F. to about 225° F.
    (c) thereafter adding a first acid portion containing at least one acid selected from the group consisting of non-toxic edible acids and acidogens which are capable of forming non-toxic edible acids upon slow hydrolysis and mixtures thereof, in an amount sufficient to lower the pH of the milk to from about 4.8 to about 5.1, while maintaining substantially the same butterfat content of said milk,
    (d) allowing the milk having a pH of from about 4.8 to 5.1 to stand for a period of at least about 15 minutes at a temperature of from about 40° F. to 80° F. and
    (e) thereafter adding a second acid portion containing at least one compound selected from the group consisting of non-toxic edible acids and acidogens which are capable of forming non-toxic edible acids upon slow hydrolysis and mixtures thereof in an amount sufficient to lower the pH of the milk to a range of from about 4.2 to 4.5, while maintaining the same butterfat content of said milk.

2. The process of claim 1 wherein said stabilizer comprises a mixture of locust bean gum and gum tragacanth.

3. The process of claim 1 wherein said stabilizer comprises a mixture of locust bean gum and carrageenan.

4. The process of claim 1 wherein said acid comprises a mixture of lactic acid, acetic acid and citric acid.

5. The process of claim 1 wherein an edible inorganic, metallic water-soluble phosphate is introduced into the milk in an amount of from 0.01% to 1% by weight based on the weight of the milk prior to the addition of said first acid portion.

6. The process of claim 1 wherein said acid is lactic acid.

7. The process of claim 1 wherein said stabilizer comprises a mixture of tapioca flour, tapioca starch and gum tragacanth.

8. A process of preparing buttermilk by direct acidification comprising the following steps:
    (a) providing milk having a butterfat content of from about 0.02% to about 5% by weight and a non-fat solids content of 8% to 12% by weight,
    (b) intimately introducing an edible organic colloidal stabilizer into said milk in an amount of at least 0.01% by weight based on the weight of said milk at a temperature of from 34° F. to 80° F.,
    (c) heating said stabilizer-containing milk to a temperature of 160° F. to 225° F. and thereafter cooling said stabilized milk to a temperature of from 35° F. to 85° F.
    (d) thereafter adding a first acid portion containing at least 1 acid selected from the group consisting of non-toxic edible acids or acidogens, which are capable of forming non-toxic edible acids upon slow hydrolysis, and mixtures thereof, in an amount sufficient to lower the pH of the milk to from about 4.8 to about 5.1 while maintaining substantially the same butterfat content of said milk,
    (e) allowing the milk having a pH of from about 4.8 to 5.1 to stand for at least 15 minutes at a temperature of from about 40° F. to 80° F., and
    (f) thereafter adding the second acid portion containing at least one compound selected from the group consisting of non-toxic edible acids and acidogens which are capable of forming non-toxic edible acids upon slow hydrolysis and mixtures thereof in an amount sufficient to lower the pH of the milk to a range of from about 4.2 to 4.5, while maintaining the same butterfat content of said milk.

9. The process of claim 8 wherein a compound selected from the group consisting of carbon dioxide and carbon dioxide liberating compounds is introduced into said milk prior to the introduction of said first acid portion.

10. The process of claim 8 wherein said stabilizer comprises a mixture of locust bean gum and gum tragacanth.

11. The process of claim 8 wherein said stabilizer comprises a mixture of locust bean gum and carrageenan.

12. The process of claim 8 wherein said acid is a mixture of acids comprising lactic acid, citric acid and acetic acid.

13. The process of claim 8 wherein an edible water-soluble inorganic metallic phosphate is introduced into said milk in an amount of from 0.01% to 1% by weight, based on the weight of the milk prior to the addition of the first acid portion.

References Cited

UNITED STATES PATENTS 2,956,885   10/1960   Roundy et al. _____ 99—116

A. LOUIS MONACELL, *Primary Examiner.*

L. M. SHAPIRO, *Assistant Examiner.*